United States Patent [19]

Granz et al.

[11] Patent Number: 4,725,989

[45] Date of Patent: Feb. 16, 1988

[54] METHOD CONTROLLING THE FOCUSING OF AN ULTRASONIC FIELD AND APPARATUS FOR PERFORMING SAID METHOD

[75] Inventors: Bernd Granz, Oberasbach; Peter Krämmer; Bertram Sachs, both of Erlangen, all of Fed. Rep. of Germany

[73] Assignee: Siemens Aktiengesellschaft, Munich, Fed. Rep. of Germany

[21] Appl. No.: 940,844

[22] Filed: Dec. 12, 1986

[30] Foreign Application Priority Data

Dec. 20, 1985 [DE] Fed. Rep. of Germany ....... 3545352

[51] Int. Cl.⁴ .............................................. H04B 17/00
[52] U.S. Cl. ....................................... 367/13; 367/150; 73/1 DV; 73/642
[58] Field of Search ................. 367/13, 103, 138, 150, 367/151; 73/1 D, 1 DV, 642

[56] References Cited

U.S. PATENT DOCUMENTS

| | | | |
|---|---|---|---|
| 4,387,599 | 6/1983 | Samodovitz | 367/150 |
| 4,430,883 | 2/1984 | Auphan | 73/1 DV |
| 4,440,025 | 4/1984 | Hayakawa et al. | 73/642 |
| 4,475,376 | 10/1984 | Keilman | 73/1 DV |
| 4,476,549 | 10/1984 | Dragonette et al. | 73/1 DV |
| 4,510,810 | 4/1985 | Kanda et al. | 73/642 |
| 4,576,034 | 3/1986 | Ferree et al. | 73/1 DV |

FOREIGN PATENT DOCUMENTS

| | | |
|---|---|---|
| 0133665 | 7/1984 | European Pat. Off. |
| 0133946 | 7/1984 | European Pat. Off. |
| 3220751 | 8/1983 | Fed. Rep. of Germany |

*Primary Examiner*—Charles T. Jordan
*Assistant Examiner*—John W. Eldred
*Attorney, Agent, or Firm*—Kenyon & Kenyon

[57] ABSTRACT

The invention concerns a method for surveying the focal point (F, F') of a focussed ultrasonic field (8, 14) and an apparatus for carrying out the method. According to the invention an ultrasonic field (4, 12) produced by an ultrasonic transmitter (2) is measured at several sites in a plane in the path of the waves at the site of the imaging device (6). The values determined at these sites are compared with given reference values for which the position of the focus is known. In an advantageous device, one surface of the imaging device (6) is equipped with several piezoelectric transducers.

9 Claims, 12 Drawing Figures

METHOD CONTROLLING THE FOCUSING OF AN ULTRASONIC FIELD AND APPARATUS FOR PERFORMING SAID METHOD

BACKGROUND OF THE INVENTION a. Field of the Invention

The invention concerns a method for the control of the focusing of ultrasonic field and apparatus for performing the method.

b. Description of the Prior Art

Focussed ultrasonic fields are used, for example, in medicine to break up concretions present in the body, e.g., kidney stones. Such a procedure is advantageous in the avoidance of surgical interventions, the introduction of probes into the patient's body and the dangerous infections connected therewith.

Equipment for the shattering of a concretion without direct contact is known from EP-A2 0 133 665, where the approximately level ultrasonic wave produced in a shock tube is focussed on the target area with an acoustic lens or a system of acoustic lenses. A coupling medium is located between the lens or the system of lenses and a copper membrane serving as ultrasonic radiator. The shock tube can be aimed at the concretion with the aid of a holder so that the focal point of the lens on the side of the image lies in the concretion. The lens can also be shifted along the axis of the shock tube with the aid of a fine adjustment means for the exact positioning of the focal point.

A disadvantage of the mentioned equipment consists in its inability to detect changes in the focusing of the field. For example, a change in the position of the focal point or a change in its lateral and axial position, during the use of the equipment. For the determination of the focusing of the field, the instrument must be removed from the patient and checked in a suitable device. Such changes in the focal properties may occur, for example, through a change in the wave field emitted by the ultrasonic transmitter or through a mechanical change in the adjustment of the imaging system.

SUMMARY OF THE INVENTION

An objective of the present invention is to provide a method for the determination of the focusing of an ultrasonic field within an object possible even during the application of ultrasonic waves to said object.

This objective is attained according to the invention by an imaging device wherein the spatial and time-dependent distribution of acoustic pressure in an imaginary surface intersecting the path of the waves is mathematically linked with the focusing of the waves. This imaginary surface, which may be curved, can lie within or on the imaging areas of the imaging device. The greater the resolution with which the acoustic pressure distribution in the plane of section is known, the more accurately the focal properties can be reconstructed. The position of the focus is checked by comparing the values determined at given locations in the path of the waves with the reference values established by calibration for which the position of the focus is known. If the determined values lie outside of an acceptable range of reference values, this is an indication that the properties of the ultrasonic field have changed and that an inadmissible change in the position of the focus has occurred.

Thus, a change in the focal properties during the application of ultrasound to the object is recognized by the above-mentioned procedure. When the procedure is employed, e.g., during the use of a lithoclast, the danger of damage to the healthy kidney surrounding the concretion is decreased.

In a suitable device for performing the procedure, ultrasonic receivers are arranged in the path of rays. The ultrasonic receivers consist preferably of piezoelectric polymer foils equipped with metal electrodes and connecting leads.

The ultrasonic receivers consisting of piezoelectric polymer foils are arranged to advantage on a surface of the imaging device.

These ultrasonic receivers can be in the form of single, spatially separated foils or of a continuous polymer foil that is equipped with a matrix-type electrode assembly in which an electrode is connected to a respective connecting lead.

In an especially advantageous practical example, a piezoelectric polymer foil equipped with at least one ring-shaped outer electrode and with a circular disk-shaped center electrode is located on the surface of the imaging device facing the focus. The circular symmetric configuration of the receiver surface guarantees that areas of the focussed ultrasonic field at least approximately in phase are monitored by a single receiving element and that the number of receiving elements to be selected is reduced with the given total receiver surface area.

In another advantageous example, an acoustic lens is separated into two parts with a piezoelectric polymer foil that is also equipped with a matrix-type electrode assembly.

In a simplified practical example, the sonic field is monitored only at few predetermined points at the site of the imaging device. In an advantageous example the elements of the imaging device are provided for this purpose with bore holes into which the ultrasonic receivers are placed. Ultrasonic receivers of piezoceramics can also be used if a lens with bore holes in the peripheral area is used.

BRIEF DESCRIPTION OF THE DRAWINGS

The invention is further explained with the diagrams in which the principle of the invention is described in FIGS. 1, 2, 3 and 4.

DETAILED DESCRIPTION OF THE INVENTION

Figure 1:
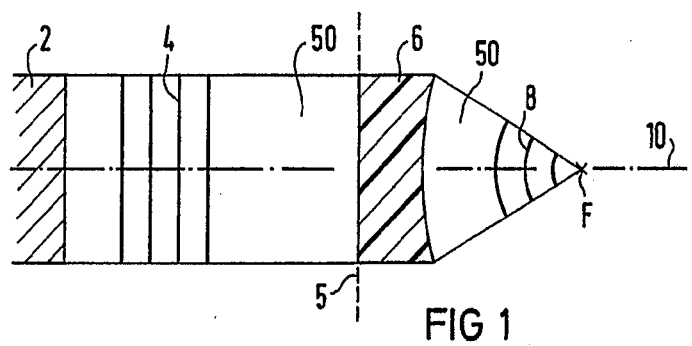

According to FIG. 1, for example a planar ultrasonic wave field 4 produced by an ultrasonic transmitter is incident on an acoustic lens 6 used as an imaging device. Acoustic lens 6 changes the planar wave field 4 into a spherical wave field 8, the center of the radius of which coincides, under ideal imaging conditions, with focal point F of acoustic lens 6, lying on the imaging side, of the axis of lens 10. Acoustic lens 6 may be, for example, a planoconcave lens 6, which then acts as a collecting lens when the speed of sound in the lens exceeds the speed of sound in sound-carrying medium 50 surrounding the lens. Lens 6 may consist of a polymer, preferably methyl polymethacrylate PMMA or polystyrene PS when the medium 50 surrounding the lens is water. In a plane of section 5 normal to the path of planar wave 4, the spatial distribution of the acoustic pressure is homogeneous and any signals taken at various measuring points in the plane of said section 5 are in phase.

Figure 2:
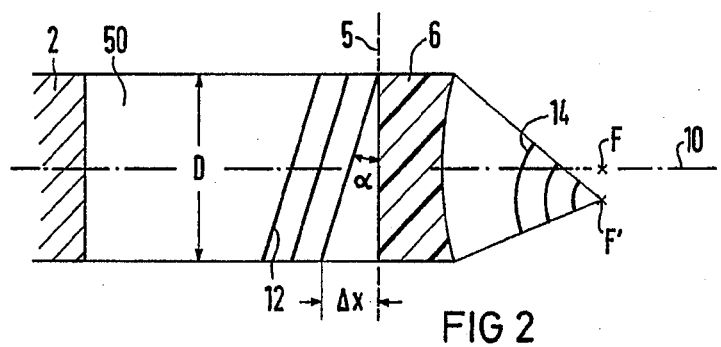

In FIG. 2, the imaging conditions are shown for the case in which for example a planar ultrasonic wave 12 is incident on acoustic lens 6, which is not parallel to lens axis 10. A spherical acoustic wave field 14, results from this planar wave 12, which has at its center the image-side focal point F' produced in the image space. Focal point F' does not lie on lens axis 10 and thus no longer coincides with focal point F of acoustic lens 6. Any test signals measured in plane of section 5 are no longer in phase since the planes of coincident phase are inclined toward section 5 at an angle as shown. The test signals determined in the path of rays of plane wave field 12 in the plane of section 5 show a time lag with respect to each other. The maximal time lag $\Delta t_{max}$ between two test signals is then $\Delta x/c$, where c is the speed of sound in sound-carrying medium 50 and $\Delta x$ is determined from the equation $\Delta x = D.\tan \alpha$ where D is the aperture or diameter of 12. When such a time lag of the test signals determined at various locations within plane of section 5 is observed, the conclusion may be drawn that the bilateral focal point F' no longer coincides with the focal point on the image side. In the example shown in FIG. 2, the focal point F' on the image can be determined from the maximal time lag $\Delta t_{max}$ when the properties of lens 6 are known.

Figure 3:
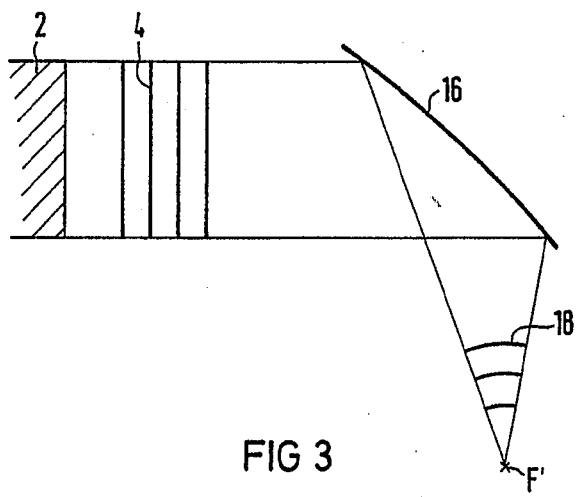
Figure 4:
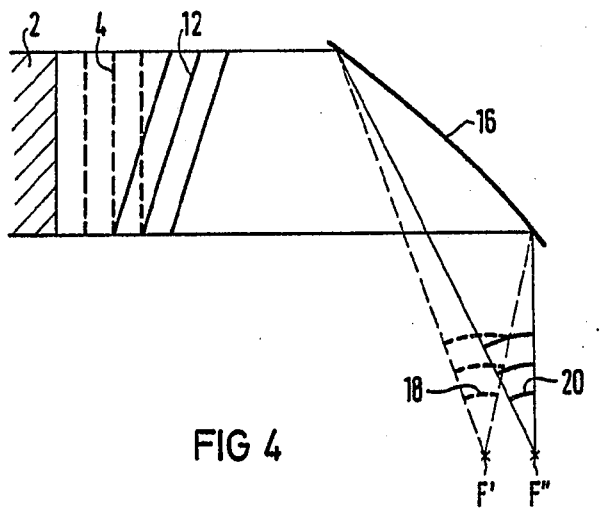

A metallic concave mirror can also be used for the focussing of an ultrasonic field. The imaging conditions for two plane wave fields 4 and 12 incident on a concave mirror 16 are shown in FIGS. 3 and 4. Spherical wave fields 18 and 20 with foci F' and F'' lying at different locations in the image space are formed according to the direction of propagation of their respective planar waves.

When the spatial and temporal distribution of the acoustic pressure in a plane of the path of waves and the geometric and acoustic properties of the medium located between this plane of section and the focal point are known, the focusing can be reconstructed from them, since the mathematical relations existing between the distribution of the acoustic pressure in the given plane of section and the properties of the focus are then known. This is also valid, when the acoustic waves incident on the imaging device are not planar as in the examples of FIGS. 1 to 5. For example, when the plane of section lies in an area in which an ultrasonic wave, for example a plane wave 4 or 12, incident on imaging device 6 or 16, respectively, is measured, the properties of the imaging device must be known for the reconstruction of the focal properties.

When the time-wise course of the acoustic pressure is determined only at a few given points in the plane of section, the focal properties can no longer be exactly reconstructed. But the test values for the acoustic pressure amplitude determined at these points can be compared with the corresponding reference values for which the location of the focus is known, and therefore a control of the focusing is possible. When the test values do not agree with the reference values within given limits, the conclusion may be drawn that the properties of the sonic field and thus also the focal properties have changed in an unpermissible manner.

Figure 5:
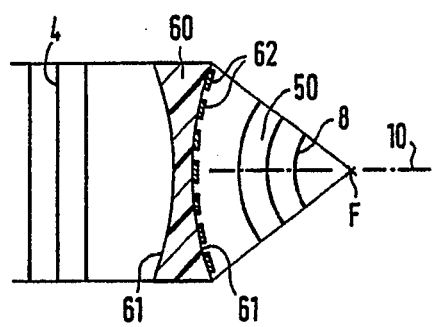
FIGS. 5 and 6 represent in sectional views of two embodiments, respectively.

According to FIG. 5, an acoustic lens 60 is equipped on one of its imaging surface 61 with several piezoelectric transducers 62, which can be arranged in the form of a matrix, for example. Acoustic lens 60 is made preferably of a plastic, such as polystyrene PS. The piezoelectric transducers 62 are preferably made of an piezoelectric polymer, for example, a polarized polyvinyl chloride PVC, or preferably polarized polyvinylidene fluoride PVDF, and are equipped with thin metal electrodes. This offers the advantage that the acoustic impedance of piezoelectric transducers 62 is largely adjusted to the acoustic impedance of sound-carrying medium 50 and the acoustic impedance of the lens. This results in an advantageous decrease in interference at the boundaries between lens 60 and ultrasonic transducers 62 as well as between ultrasonic transducers 62 and sound-carrying medium 50. Furthermore, a polymer foil can be readily applied to the curved lens surface because of its good workability and malleability.

Figure 6:
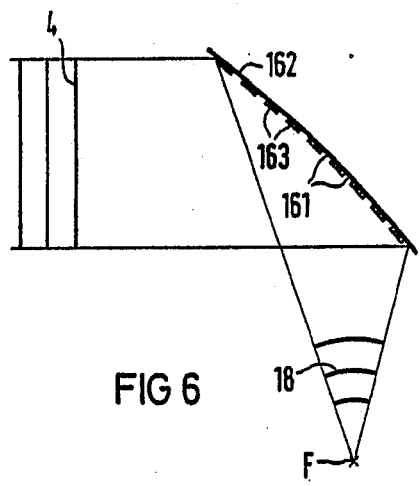

In the arrangement shown in FIG. 6, the reflecting surface 161 of a concave mirror 162 is equipped with piezoelectric transducers 163. Again in this case, the piezoelectric transducers 163 consist advantageously of a piezoelectric polymer foil equipped with electrodes because of the curved surface 161 of concave mirror 162.

Figure 7:
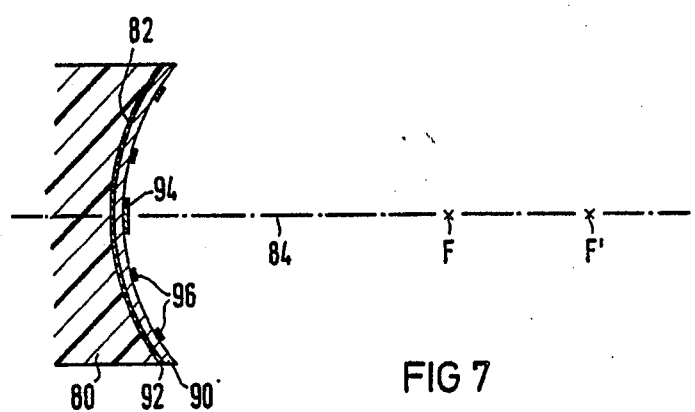
FIGS. 7 and 8 represent an assembly in a sectional and a plan view, respectively, in which the surface of the imaging device facing the focus is equipped with ring-shaped ultrasonic receivers.
Figure 8:
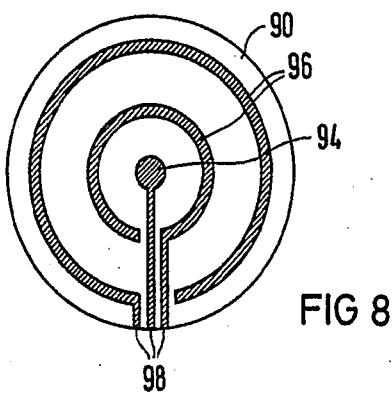

In the embodiment of FIG. 7, a lens 80 is equipped with a piezoelectric polymer foil 90 on its surface 82 facing the focal point F located on the image side. Piezoelectric polymer foil 90 has at its flat side facing lens 80 a continuous electrically conducting layer 92, for example made of metal. The piezoelectric polymer foil is equipped with electrodes 94 and 96 on its flat side facing the focal point F on the image side. According to FIG. 8, several ring-shaped outer electrodes 96 are arranged electrically separated from each other about a center electrode 94. Connecting leads 98 lead from electrodes 96 and 94 to the edge of the foil. Electrodes 94 and 96 have a rotation of spherical symmetrical configuration about lens axis 84, with the exception of the area formed by connecting leads 98. The shape of electrodes 94 and 96 conforms to the radius of curvature of surface 82. With a concave surface 82, center electrode 94 is shaped like a spherical cap. When surface 82 is planar, center electrode 94 has the shape of a circular disk. When the diameter of center electrode 94 and the width of outer electrode 96 are chosen sufficiently small, each electrode 96 and 94 is guaranteed to intersect with the spherical wave directed to the focal point F located on the image side at sites approximately in phase, due to the rotation symmetrical arrangement of electrodes 96 and 94. In this case, a fixed phase difference exists between the test signals forming at the individual electrodes, which results from the different distances of the spherical ultrasonic wave from the focal point F on the image side and the speed of sound. Care must be taken that the radius of curvature of lens 80 is generally not identical with the radius of curvature of the spherical wave at the site of lens surface 82. A shift of the focus of the ultrasonic wave on the image side can then be recognized by the fact that the phase relations resulting between the individual signals during the focussing in the focal point F are no longer fulfilled. A lateral shift of the focus on the image side, for example, to point F' on lens axis 84 is then expressed in a decrease in the phase difference between the electrical singals measured at the individual electrodes 94 and 96. The position of focus F' can in this case be calculated from the measured phase difference.

Figure 9:
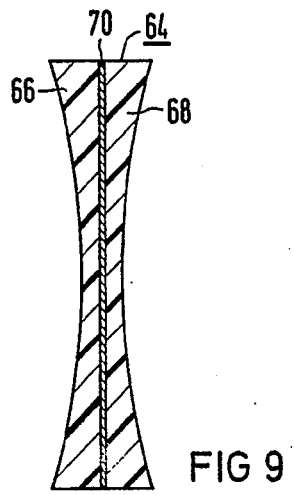
In FIGS. 9 and 10, an especially advantageous embodiment of an acoustic lens with an ultrasonic receiver matrix is shown in a sectional view and from above, respectively.
Figure 10:
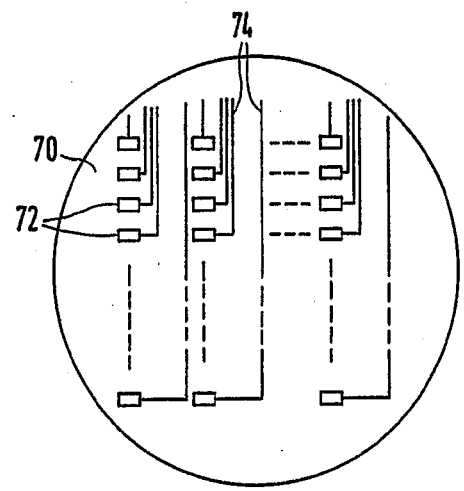

In FIG. 9, a lens 64 is divided into two parts 66 and 68 by a single piezoelectric polymer foil 70. According to FIG. 10, the piezoelectric polymer foil 70 is equipped on a flat side with an assembly of electrodes 72, for example in the form of a matrix, from which connecting leads 74 lead to the edge of foil 70.

Figure 11:
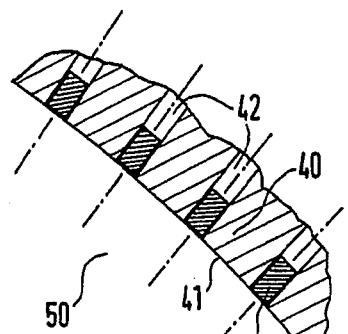
FIGS. 11 and 12 show ultrasonic receivers set in an imaging element with bore holes.

In FIG. 11, a concave mirror 40 is equipped with bore holes 42, which extend vertically to its surface 41. Ultrasonic receivers 34 are set in the bore holes 42. The ultrasonic transducers 34 consist preferably of a material with a high acoustic impedance, e.g. of a piezoceramic material, to keep the transmission losses at the interface with sound-carrying medium 50 as low as possible.

Figure 12:
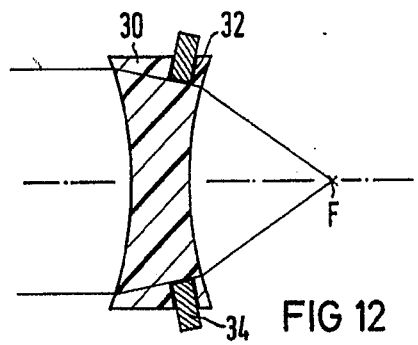

In FIG. 12, a lens 30 is equipped at the edge of the lens with bore holes 32, into which the ultrasonic transducers 34 are set. This simplified embodiment is particularly suitable for simple control measurements for the sole purpose of checking whether the position of the focus still agrees with the position determined by preceding calibration. Such a device is less suitable for an exact determination of the focal properties, since a change in the ultrasonic field is determined only in the peripheral area of a cross-sectional area through the path of rays. Since the ultrasonic field is influenced by transducers 34, high acoustic impedance transducers can be used as well. Obviously modifications can be made to the invention without departing from its scope as defined in the appended claims.

What is claimed is:

1. A method for surveying the properties of a focus of an acoustic wave, the focus being formed by an imaging device, comprising the steps of:
    measuring said wave at several sites disposed in an imaginary surface intersecting the path of said acoustic wave, said surface corresponding to a focusing surface of said imaging device to obtain test signals; and
    comparing said test signals to preselected reference values corresponding to a test acoustic wave with a known focus.

2. An apparatus for surveying the properties of a focus of an acoustic wave comprising:
    an imaging device including an acoustic lens consisting of a polymer; and
    transducer means attached to said lens for measuring test signals, said transducer means including a piezoelectric polymer foil disposed on a surface of said lens.

3. The apparatus according to claim 2 wherein said piezoelectric polymer foil is partitioned into an assembly of electrodes in the form of a matrix, each of said electrodes having connecting lead extending to an edge of the polymer foil.

4. The apparatus according to claim 3, wherein said imaging element includes an acoustic lens, said lens being separated into two parts by said piezoelectric polymer foil.

5. The apparatus according to claim 2 wherein said imaging device includes an acoustic lens having a focal point F, and a surface facing said focal point, said piezoelectric polymer foil being arranged on said surface, said piezoelectric polymer foil having a center electrode conforming to the curvature of said surface (82) and ring-shaped outer electrodes (96) arranged concentrically about said center electrode, said electrodes being equipped with connecting leads, which extend to an edge of said polymer foil (90); said electrodes being arranged substantially rotation symmetrically about the axis of said lens (84).

6. An apparatus for surveying the properties of a focus of an acoustic planar wave comprising:
    an imaging device;
    an imaging element of said imaging device having a focal point and a plurality of bore holes; and
    transducer means disposed in said holes for generating signals, which signals may be compared to reference values corresponding to a test acoustic wave with a known focus to determine whether the focal point of said acoustical planar wave coincides with the focal point of said imaging element.

7. A method for surveying the properties of a focus of an acoustic wave, the focus being formed by an imaging device, comprising the steps of:
    measuring said wave at several sites disposed in an imaginary surface intersecting the path of said acoustic wave, said surface being located inside said imaging device to obtain test signals; and
    comparing said test signals to preselected reference values corresponding to a test acoustic wave having a known focus.

8. An apparatus for surveying the properties of a focus of an acoustic wave comprising:
    an imaging device including a concave mirror; and
    transducer means attached to said lens for measuring test signals, said transducer means including a piezoelectric polymer foil disposed on a surface of said concave mirror.

9. The apparatus according to claim 8 wherein said piezoelectric polymer foil is partitioned into an assembly of electrodes in the form of a matrix, each of said electrodes having connected lead extending to an edge of the polymer foil.

* * * * *